United States Patent [19]

Triplett

[11] Patent Number: 4,870,310
[45] Date of Patent: Sep. 26, 1989

[54] PORTABLE CRASH-SURVIVABLE KINETIC ENERGY STORAGE MACHINE

[76] Inventor: Billy R. Triplett, Box 1414, Lexington Park, Md. 20653

[21] Appl. No.: 163,321

[22] Filed: Mar. 2, 1988

[51] Int. Cl.$^4$ .................. H02K 7/02; F16C 39/06; G01C 19/28
[52] U.S. Cl. ........................... 310/74; 74/5.46; 310/88
[58] Field of Search ............ 74/5.46, 5.7, 572; 310/74, 90.5, 43, 88, 105, 153

[56] References Cited

U.S. PATENT DOCUMENTS

| | | | |
|---|---|---|---|
| 4,068,533 | 1/1978 | Ferriss | 310/90.5 |
| 4,132,130 | 1/1979 | Schneider | 74/572 |
| 4,207,778 | 6/1980 | Hatch | 74/572 |
| 4,337,981 | 7/1982 | Meinke | 310/90.5 |
| 4,444,444 | 4/1984 | Benedetti et al. | 310/90.5 |
| 4,507,983 | 4/1985 | Kiss | 74/572 |

Primary Examiner—Patrick R. Salce
Assistant Examiner—D. L. Rebsch
Attorney, Agent, or Firm—Walter G. Finch

[57] ABSTRACT

A portable crash-survivable kinetic flywheel storage machine which makes use of a ring shaped flywheel which is designed to be suspended by electromagnetic levitation. The structural and mechanical arrangement combine to allow functions which the unique electronic suspension system will interact with. The combination will allow rigid suspension and special crash stabilization capability, which is more important to the function of this particular invention than the efficiency advantage of the ring shape by itself. The flywheel is mostly composed of circumferentially wound fiber reinforced composite material. Induction loops are embedded in the skin of the flywheel, and a thin magnetic ring is positioned along the inside of the flywheel. This minimum excess mass is attached to the high strength flywheel in order to reduce the total parasitic momentum which will have to be controlled by the magnetic levitation system due to outside forces. A solid, hermetically sealed, physical enclosure surrounds the flywheel. A sealed vacuum chamber is located between the bulkhead and the flywheel. This bulkhead, in turn, is surrounded by another vacuum chamber formed between the bulkhead and an outer thermal insulation container, made of several thick layers of light weight crushable material.

A special mechanical and electronic system, with the structural and mechanical arrangement being combined, allows functions of the flywheel which the electronic suspension system will interact with.

13 Claims, 5 Drawing Sheets

PORTABLE CRASH-SURVIVABLE KINETIC ENERGY STORAGE MACHINE

This invention is a useful improvement of kinetic energy storage machines. The major purpose of this invention is to provide improved levels of safety during violent shock accelerations which could happen to the machine during operation in portable applications.

At the same time the invention is able to provide high performance levels of energy storage capability and efficiency not previously available in a system as safe as this one for portable operation. This combination of advantages is particularly useful when energy storage performance levels are pushed as high as the most modern composite flywheel materials make possible.

The principle of operation for this particular invention is similar to all kinetic energy storage machines which store electricity by using a motor to spin a flywheel, and then use the flywheel to run a generator. In order to achieve high levels of energy storage capacity, kinetic energy storage machines require high strength rotating flywheels suspended without physical contact, while operating in a vacuum to reduce high speed friction.

This invention makes use of a ring shaped flywheel which is designed to by specially accomodated by the machine's physical enclosure and electromagnetic flywheel levitation system. During a collision, these components function together in a unique way to allow the flywheel and the bulkhead (or wall) immediately surrounding the flywheel to behave as if they were together a single object located in the center of a thick surrounding layer of crushable thermal insulation material.

It is an object of this invention to provide a new type of kinetic energy storage machine which allows safety during a violent accidental collision in portable applications.

Another object of this invention is to provide a required electromagnetic flywheel levitation system capable of producing levitation force which will allow the inner components to crush the provided thermal insulation material during a collision.

A further object of this invention is to provide a capability for continued operation of the electromagnetic flywheel levitation system during a kinetic energy unloading period which would be required immediately after an accidental violent collision.

Still another object of this invention is to provide a required electronic control system which will be able to control the flywheel levitation electromagnets without producing significant waste heat in the electronic control system.

Yet another object of this invention is to provide a required lightweight alternating current electric motor-generator unit integrated into the spinning flywheel and stationary enclosure for the purpose of accelerating or decelerating the rotation of the levitated flywheel.

And a further object of this invention is to provide a kinetic energy storage machine which does not sacrifice high energy storage capacity in order to provide collision safety.

DESCRIPTION OF THE PREFERRED EMBODIMENTS

Figure 1:
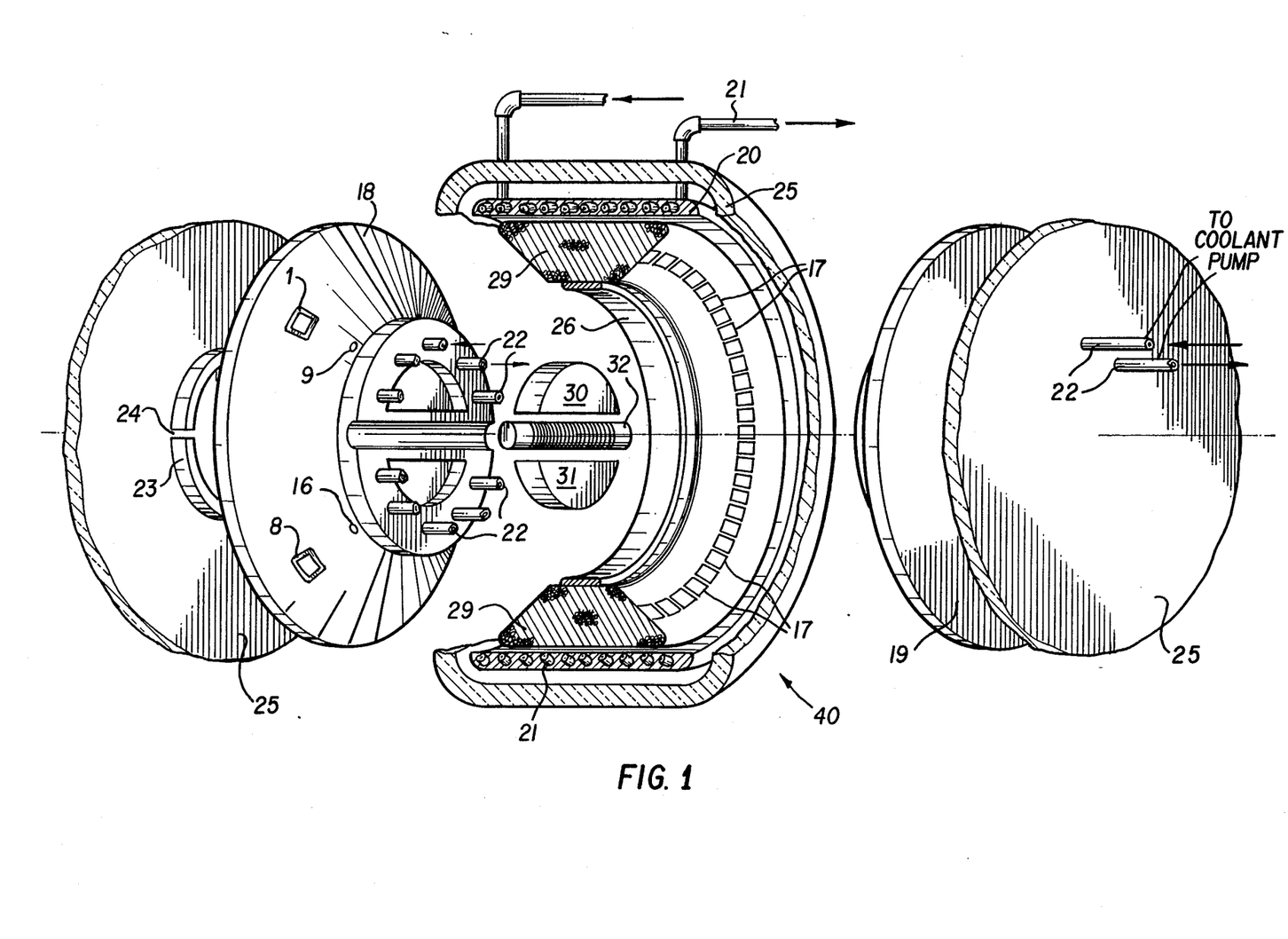
FIG. 1 is a exploded perspective view of a kinetic energy storage machine which incorporates features of this invention.

Referring now to FIG. 1 of the drawings, there is shown a portable crash-survivable kinetic energy storage machine 40. As shown in FIG. 1, a flywheel 29 is provided, and it is mostly composed of reinforced composite material.

The only extra materials attached to the flywheel 29 are the induction loops 17 and a thin magnetic ring 26 positioned along the inside radius of the flywheel 29. The thin magnetic ring 26 acts as the rotating permanent magnet of a special lightweight AC motor-generator system composed of the ring 26 and the centrally located bar electromagnet 32.

The thin magnetic ring 26 does not produce magnetic field for levitation of the flywheel 29. Instead, it is a part of the motor-generator providing acceleration or deceleration of the rotation of the flywheel 29. The motor-generator provides this function while being as lightweight as possible, which is one factor contributing to the safe support of the flywheel 29 during a collision.

When the machine 40 experiences a violent collision, this machine 40 is able to prevent the high speed rotating flywheel 29 from being able to destructively contact the inside surface of its enclosure 18, 19, 20, which is the major safety consideration. Safety in this situation is important because of the tremendous destruction of material which could result from contact between the high speed flywheel 29 and its enclosure 18, 19, 20.

Figure 3A:
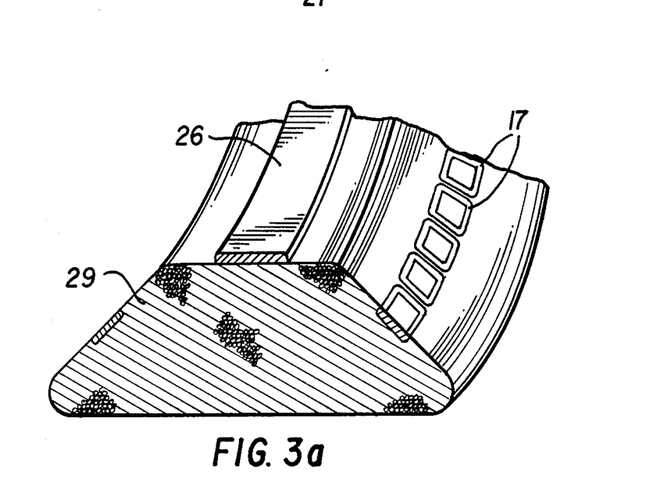
FIG. 3a is a detail sectional view of the flywheel.
Figure 3B:
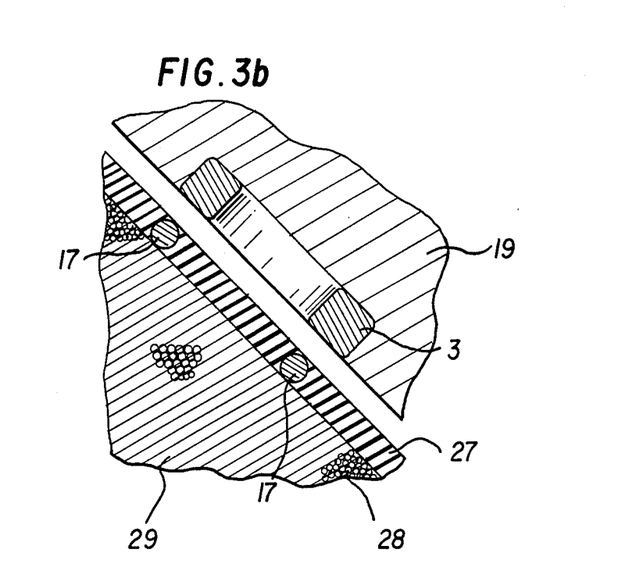
FIG. 3b is a detail sectional view showing part of the flywheel and the right side of the interior bulkhead enclosure (or wall) which surrounds the flywheel.

The flywheel 29, is shown in detail in FIGS. 3a and 36. Referring now to FIG. 3b, the flywheel 29 is shown with embedded fibers 28, and a skin 27. Induction loops 17 are shown embedded in the skin material 27. FIG. 3b also shows a section of the flywheel enclosure which is the right bulkhead (wall) side 19. The right bulkhead side 19 has a levitation electromagnet 3 embedded within it.

Referring now to FIG. 3a, a part of the flywheel 29 is shown supporting the weight of a part of the thin ring of acceleration. The flywheel composite material 29 is the tensile stress load bearing material. The material of the small magnetic ring 26 does not need to be as strong as the composite material of the flywheel 29 because the load bearing material in the flywheel 29 can effectively support the centrifugal load imposed by the thin ring of magnetic material 26. This allows the stronger material to protect the weaker magnetic material 26 from experiencing high tensile stress.

Similarly, the embedded induction loops 17 are able to transfer their limitation force load into the composite material of the flywheel 29 compressively. The buttressed sides of the flywheel 29 are useful in supporting the distributed load of the magnetic material of the thin ring 26 and the levitation force of the induction loops 17 because the composite material of the flywheel 29 transfers the loading into circumferential tensile stress along the embedded high strength whisker fibers 28.

Figure 2:
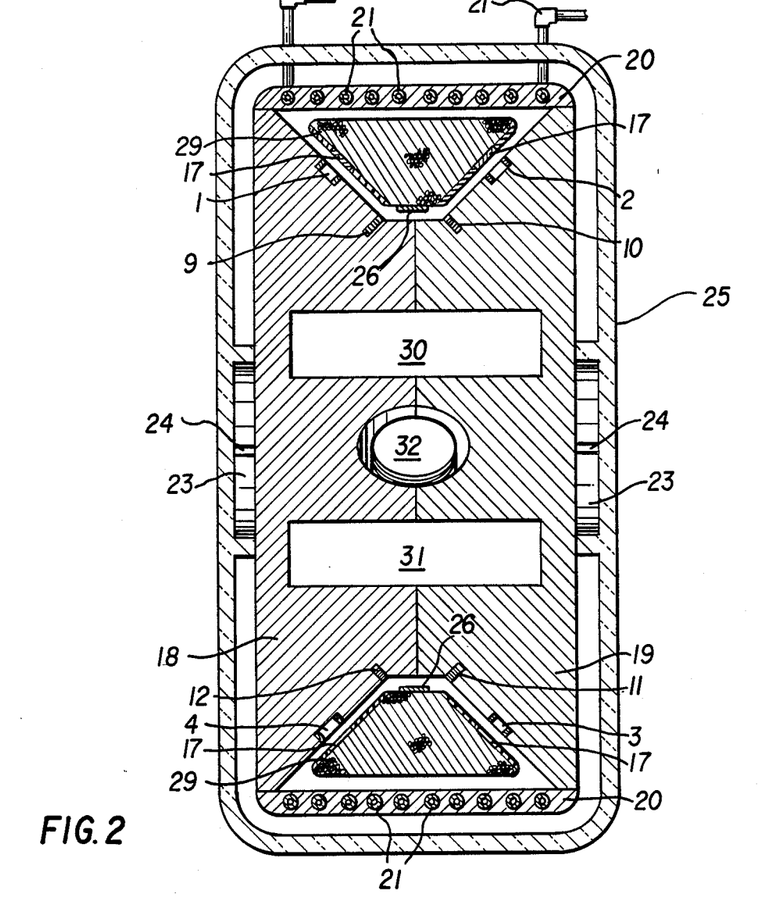
FIG. 2 is a front sectional view, of the invention taken at a diagonal in FIG. 1.

Referring to FIG. 2, surrounding the flywheel 29, there is a solid evacuatese, physical enclosure composed of a left bulkhead side 18, a right bulkhead side 19, and a bulkhead shell 20, which are together referred to as being the interior bulkhead 18, 19 20. The space between the rotating flywheel 29 and this stationary interior bulkhead 18, 19, 20 is a sealed vacuum chamber. The interior bulkhead 18, 19, 20 shown surrounded by another vacuum chamber formed between the interior bulkhead 18, 19, 20 and an outer thermal insulation container 25.

In a working machine 40, the outer thermal insulation container 25 will be made of several thick layers of light weight crushable material which will also serve as thermal insulation. The inner surface of the outer thermal insulation. The thermal insulation container 25 is shown reduced in physical thickness in the drawings, in order to fit more easily within the drawings and to provide a clearer scale for the other components. In the drawings, the crushable thermal insulation material 25 and the outer physical enclosure of the invention 40 are shown as a single outer shell 25.

The inner surface of the outer thermal insulation container 25 and the outer surface of the interior bulkhead 18, 19, 20 can be polished to be heat reflective for a small gain in thermal insulation capability. If this is not done, the invention 40 will still be able to operate effectively.

The outer thermal insulation container 25 is attached to the interior bulkhead 18, 19, 20 by a thermal insulation standoff spacer 23, which can be most clearly seen in FIG. 1. The thermal insulation standoff spacer 23, which is a standoff spacer ring, is not a complete circle, because it has a pressure evacuation gap 24, to allow for smooth escape of air pressure when the air is pumped out of the space between the interior bulkhead 18, 19, 20 and the outer thermal insulation container 25 to form a vacuum for enhancing thermal insulation.

The outer chamber does not have to be as highly evacuated as vacuum chamber directly surrounding the flywheel 29, because its only purpose is to slightly enhance thermal insulation for the outer thermal insulation container 25. Accordingly, the outer thermal insulation vacuum is not mandatory, but can be provided. Other thermal insulation standoff spacers larger than part 23 can be used for better physical support, if needed, depending on the quality of the material used for thermal insulation The electromagnetic levitation system will be capable of absorbing lateral acceleration of the flywheel 29 caused by accidental collision shock without allowing the rapidly rotating flywheel 29 to come into contact with the interior bulkhead 18, 19, 20.

During a strong collision, the thermal insulation layers will be crushed, which will absorb the impact of the internal bulkhead 18, 19, 20 as it moves against the inside of the outer thermal insulation container 25. This will spread out the time duration of the impact, thereby reducing the magnitude of the force which will be experienced by the levitation system during a collision impulse. Afterward, the surviving thermal insulation will be degraded, but it will not be completely eliminated. This will allow a period of continued operation after a violent collision.

The first function of the invention immediately after a strong collision will be to initiate a rapid kinetic energy unloading operation. The end result will be that there is time to gracefully decelerate the spin of the flywheel 29 without damage to the flywheel 29 before the superconductive suspension system will have to be shut down due to lack from available coolant. The electrical output power of the motor-generator unit will be connected to a load, external to the stored machine 40, to bleed off the kinetic energy while there is enough coolant to keep the levitation system operating.

Figure 5:
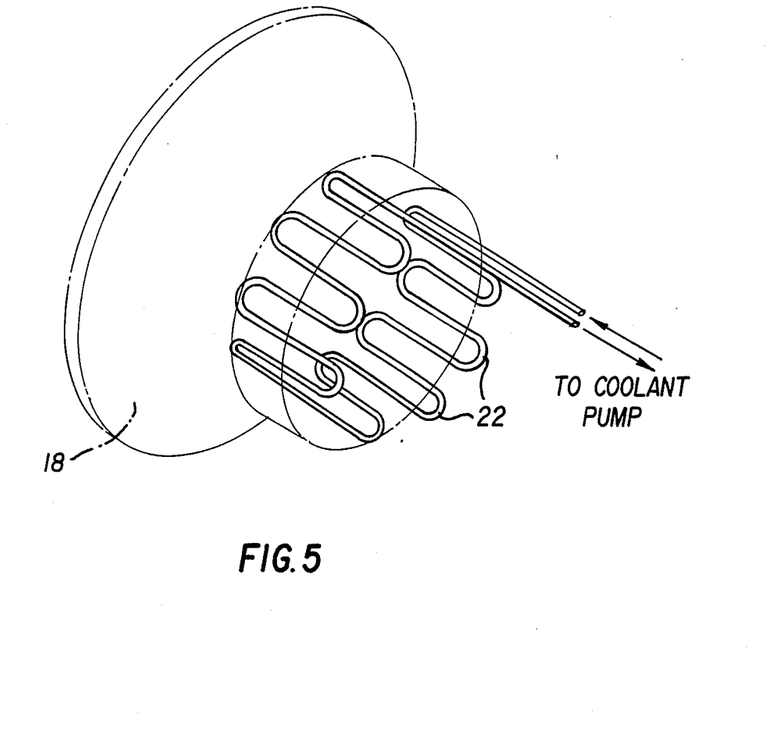
FIG. 5 is a view showing an area of coolant circulation in the interior bulkhead.

When the flywheel 29 is spinning, the interior bulkhead 18, 19, 20 is kept at a reduced temperature, most easily 77 degrees Kelvin, the temperature of liquid nitrogen, which will be adequate as the coolant. Referring to FIGS. 1 and 5, the coolant will circulate in channels 22 located in the interior bulkhead 18, 19 20. Part of the leftover interior space 31, shown best in FIG. 2, is available as an internal reservoir for emergency coolant, in addition to using an external coolant circulation system, for redundancy.

Alternatively, the invention 40 can be provided with a single reservoir of coolant without departing from the scope and intent of the appended claims.

The interior bulkhead coolant jacket 22 is more necessary than the outer bulkhead coolant jacket 21 because almost all of the excess heat produced in the interior bulkhead 18, 19, 20, will come from the electronic control system 30 which has its location shown in FIG. 1 and FIG. 2. It is located very near to the interior bulkhead coolant jacket 22 for effective conduction heat transfer. As located, the coolant jacket 22 in FIG. 5 will absorb radial heat flow from the centrally located circuitry, thereby reducing the heat which reaches the material 18, 19, 20, which immediately surrounds the flywheel 29.

The electronic circuitry used will be described after the arrangement of physical components, but it is useful to note here that the circuitry will be mostly low power complimentary metal oxide semiconductors and efficient power regulator components in order to keep heat production to a minimum. The result will be that the interior bulkhead coolant jacket 22 will be able to adequately reduce the flow of heat from the centrally located components. Instead of heat flowing from the central components into the flywheel 29, heat will flow from the flywheel 29 into the material of the low temperature interior bulkhead 18, 19, 20 by radiant heat transfer.

The outer coolant jacket 21 is shown included in the drawings, but because of thermal conduction the material of the interior bulkhead 18, 19, 20 can be cooled using only the single interior cooking jacket 22. If the outer coolant jacket 21 is omitted, then the complete interior bulkhead 18, 19, 20 can be built in a similar shape using only two physical parts. The left and right bulkhead sides 18 and 19 would be extended to each include half of the material shown in the drawings as part 20. The interior bulkhead 18, 19, 20 can be constructed either way to allow the required function.

Figure 4:
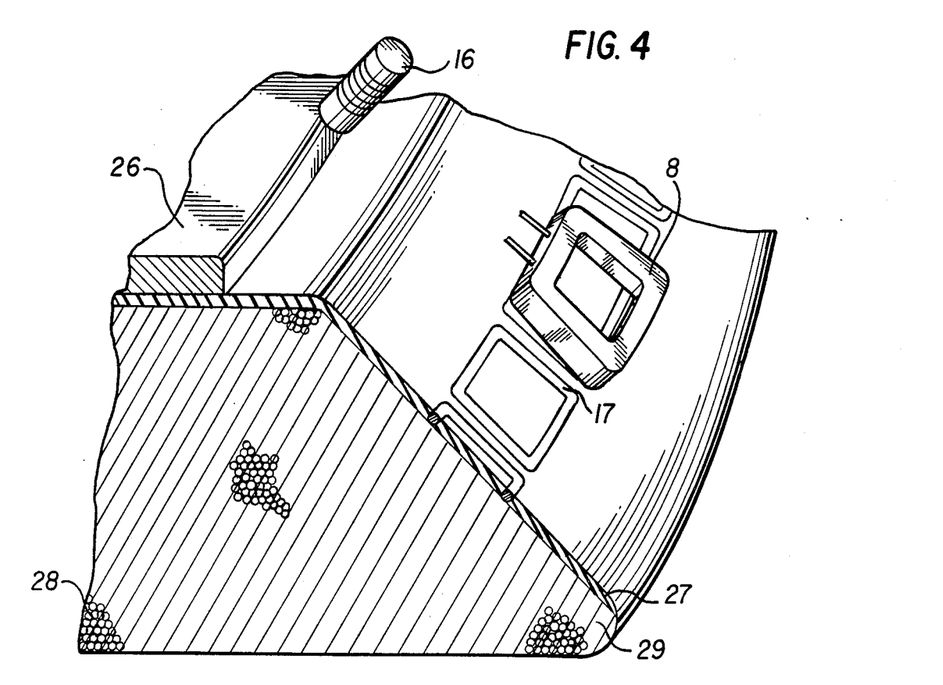
FIG. 4 is a perspective view of the flywheel showing a flywheel proximity sensor which is shown as a small cylinder in the drawing.

Referring now to FIG. 4, one of the resonant electromagnets 1-8 is shown positioned in the wall of the interior bulkhead 18, 19, 20 above the induction loops 17 which are mounted on the flywheel 29.

The embedded induction loops 17 are made of a high-temperature superconductive material, which will be superconductive at temperatures lower than 90 degrees Kelvin. Materials which provide superconductivity at higher temperatures will also be acceptable.

In order to allow the superconductive induction loops 17 to function, the material of the freely rotating flywheel 29 will also be kept at a greatly reduced temperature. It will be cooled by radiation heat transfer between the surface of the flywheel 29 and the inner surface of the low temperature interior bulkhead 18, 19, 20.

The resonant levitation electromagnets 1–8, each contains a built in parallel capacitor forming a high frequency parallel resonant circuit as a single unit. Each resonant electromagnet unit 1–8 is connected to its own electronic control system, one of which is shown in the electronic schematic drawing of FIG. 6. The invention 40 can perform its crash survivability function and not depart from the scope and intent of the appended claims if a larger or smaller number of resonant electromagnet units 1–8 are used instead of eight as shown in this particular embodiment of the invention 40.

Figure 6:
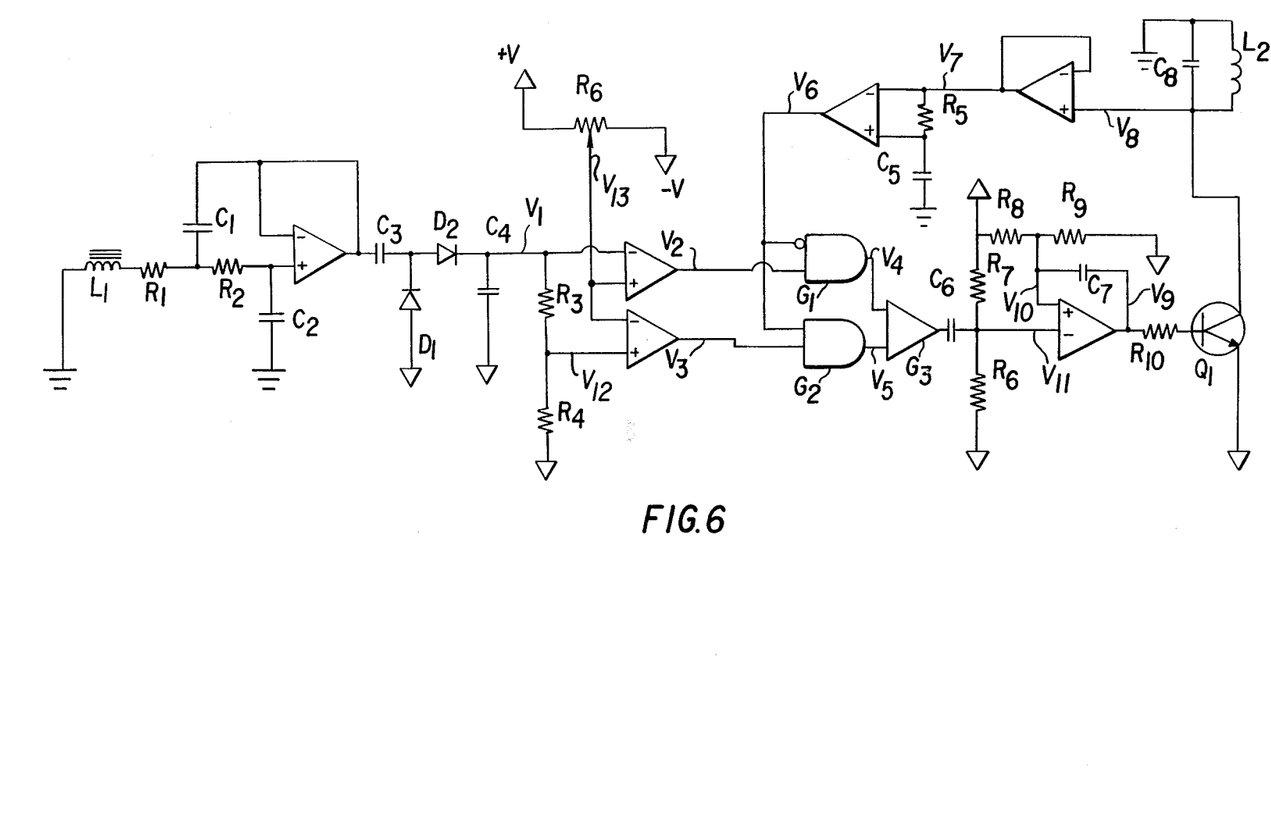
FIG. 6 is a schematic view of the electronic control system for controlling a stationary levitation electromagnet.

In FIG. 6 a parallel electromagnet and capacitor pair are shown as L2 and C8. As a single unit they are shown as part 8 in FIG. 4. The conductive material used in each resonant electromagnet unit 1–8 will be a superconductor at the operating temperature of the interior bulkhead 18, 19, 20.

For levitation of the flywheel 29 the invention 40 uses electromagnetic repulsion between the stationary electromagnets 1–8 and the moving induction loops 17 which are mounted on the flywheel 29. The electromagnetic repulsion will also be available at low rotation speeds or when the flywheel 29 is not spinning. Electromagnetic repulsion force will be provided by resonating a high frequency alternating current in each of the levitation electromagnets 1–8 mounted in the interior bulkhead 18, 19, 20. The electronic control system will control the average level of repulsion force produced by each levitation electromagnet 1–8 by controlling the level of the resonating alternating current which flows in each electromagnet 1–8.

Each electronic control circuit requires a proximity sensor which allows the electronic control system to monitor the nearness of the flywheel 29 relative to each stationary electromagnet 1–8. A method for providing a proximity sensor is shown by using an electromagnetic pickup coil, an example of which is the cylindrical coil 16 shown in FIG. 4. The same coil is shown in FIG. 6 as L1. Other commonly available transducer means for monitoring the proximity of the flywheel 29 can also be used without departing from the scope and intent of the appended claims.

In the depicted method for providing a proximity sensor, the pickup coil L1 is mostly sensitive to low frequency electromagnetic fluctuations equal to or less than the maximum rotational frequency of the flywheel 29.

The electromagnetic sensor coil 16, shown in FIG. 4, will develop a low frequency AC voltage, which will increase in magnitude when the magnetic ring 26 moves closer to the sensor coil 16, and decrease in magnitude when the ring 26 moves away.

The frequency of the voltage induced in a sensor coil unit 16 will be the same as the rotational frequency of the flywheel 29, and the frequency will vary over a wide operating range. The highest rotational frequency of the flywheel 29 will be a very low frequency compared to the resonant frequency of any particular resonant levitation electromagnet unit 1–8.

Each resonant electromagnet unit 1–8 will be provided with its own associated flywheel proximity sensor 9–16. A separate copy of the control circuit detailed in FIG. 6 will monitor the input from one proximity sensor 16 and control the repulsion force produced by its associated resonant electromagnet unit 8; most of the electronic control circuits will be able to continue functioning separately in case one or more of the individual control circuits shown in FIG. 6 fails to function. To further take advantage of this capability for reliability through redundancy, a larger number of independent levitation systems can be used instead of eight as shown in the drawings.

Referring now to FIG. 6, a sensor is represented in the control system schematic, as the inductor, L1. Parts R1, R2, C1, C2 and the associated operational amplifier form a Butterworth active low pass filter. A major purpose is that it will protect the control system from picking up stray high frequency signals from the very high frequency resonant levitation electromagnets 1–8. In FIG. 6, parts C3, D1, D2, and C4, form a rectifier unit to convert the induced AC signal into the DC control voltage, V1. The voltage, V1, will increase when the flywheel 29 moves closer to the sensor L1. Also, when the flywheel 29 does not move closer, V1 the induced AC signal in L1 will tend to increase with increasing rotational speed of the flywheel 29. A second usefulness of the Butterworth active filter is that its component values can be adjusted to offset this effect. The low pass filter will help prevent V1 from increasing due to increased speed of rotation. V1 is applied to a comparator circuit which produces the two logic control signals V2, and V3. The action of the window comparator is such that V1 is compared to the bias reference voltage, V13. R3 is a much smaller resistance than R4, so when V1 is in a narrow range near V13, both the control voltages, V2 and V3 are low.

If L1 detects that the flywheel 29 is moving too close to the interior bulkhead 18, 19, 20, then the control system needs to efficiently increase the current which is resonating in the parallel resonant circuit, L2 and C8. To initiate this, the logic signal V3 switches to a high value. If the flywheel 29 is moving too far away, V1 drops lower than its allowable voltage range, and the logic signal, V2 switches to a high value.

If V2 becomes high, this tells the control system to efficiently reduce the current resonating in the parallel resonant circuit, L2 and C8, because the flywheel 29 is moving away from the proximity sensor L1. As long as the complete invention 40 is not shaken, the resonant circuit, L2 and C8, will go on resonating to provide a steady average levitation force and not much work will be done by the control system to increase or decrease resonating current in the stationary electromagnetic levitation coil L2.

The circuitry of the electronic control system is arranged to keep the switching transistor Q1 turned off most of the time. Q1 is activated either to increase the AC current in L2, or to decrease the resonating current. In either case, Q1 applies to timed short duration pulse to the resonant circuit, L2 and C8, during a small fraction of each complete resonant oscillation cycle. This way, heat production in Q1 is minimal. Q1 is either switched on as a low resistance or it is switched off as a high resistance.

The part of the circuit shown in FIG. 6 containing parts R6, R7, R8, R9, R10, C6, C7, and their operational amplifier together form a monostable multivibrator unit which is a short duration one-shot pulse generator,. It will deliver a short duration output current pulse into the base of Q1 when the output of the OR logic gate, G3, goes through a logic signal voltage transition from a high value to a low value. Specialized chips exist for this one-shot pulse generator function, and any of them can be used here, so long as it is a CMOS cicuit or similar low power consumption chip.

The voltage in the resonant circuit, V8, will be sinusoidal, centering around the zero, ground potential. It will vary between a value greater than $-V$, and less than $+V$, the supply voltages for the dual supply. A high impedance buffer produces V7, which is equal to V8. The high impedance buffer limits the leakage of current from the resonating parallel circuit, L2 and C8, while allowing the magnitude of V8 to be monitored.

Voltage V7 is next converted into V6, which is used by the logic gates G1, G2, and G3 as a phase reference for timing the delivery of short-duration pulses into the base of Q1. V6 is useful because it is a square wave which can be given a set phase shift relative to the reference voltage V8. Because of this, the phase time can be set for delivery of short duration pulses into the base of Q1 in such a way that the timed pulses are properly synchronized for enhancement or reduction of resonant current in L2 and C8.

If the control signal V3 is switched high, and the flywheel 29 is getting too close to the sensor L1, then the pulses produced by Q1 will constructively increase the resonant current in L2 and C8 which will cause increased repulsion of the flywheel 29. If the flywheel 29 is moving too far away from the sensor 8, then V3 is switched high and pulses from Q1 will be delivered 180 degrees out of phase with the resonant current. This will reduce the current resonating in L2 and Q8, which will reduce the electromagnetic repulsion. Lastly, if the flywheel 29 is neither too close nor too far away from the proximity sensor 8, then the transistor Q1 will stay switched off.

Referring now to FIG. 1, the components of the AC motor-generator are shown as the ring of magnetic material 26, and a stationary bar shaped electromagnet 32, which is located in the center of the invention 40.

One of the useful qualities of the motor-generator is that it is physically simple in structure. Therefore, it is able to be lightweight while performing its function of accelerating or decelerating the rotation of the flywheel 29. The invention 40 requires this lightweight configuration because the total mass of the materials enclosed within the interior bulkhead structure 18, 19, 20 should be as small as possible, except for the flywheel material 29 which should be the largest portion of the total enclosed mass. In this way, most of the mass which is to be controlled by the levitation system during a collision acceleration will be composed of kinetic energy storage material in the form of strong composite fibers in the flywheel 29.

The motor-generator unit can be configured without departing from the scope and intent of the appended claims if the cylindrical shape shown for the electromagnet 32 is distorted to have a more rectangular cross section. Another variation which would also allow the required function for the motor-generator would be to construct the ring of magnetic material 26 using several separately mounted small pieces of magnetic material mounted around the inside surface of the flywheel 29.

It is necessary that the bar-shaped electromagnet 32 should produce minimum electrical heating due to current flowing in its windings. Consequently, the windings are also intended to be composed of superconductive material. Another advantage of the long, simple bar shape for the electromagnet 32 is that this shape will help to simplify the problem of manufacturing the superconductive winding for the electromagnet 32. Presently available superconductive materials are brittle instead of being ductile like metals, so they are difficult to wind on a coil form. One alternative is to physically form an entire coil winding for an electromagnet as a single molded object at the time of manufacture. However, for such a production method it is still difficult to mold a coil which is several windings deep —that is to say, short and thick in dimension. An equivalent number of coil windings can be included on the electromagnet 32 by using a single layer of winding, because the electromagnet 32 is a long thin bar shape, as shown in FIG. 1. Accordingly, part 32 will be convenient to manufacture.

In this motor-generator unit, the essential requirement is that the motor-generator should be lightweight, and not produce much heat in its windings. Additionally, the electronic control elements are also able to use the rotating magnetic field produced by part 26 as a means for sensing the separation between the flywheel 29 and the surface of the interior bulkhead 18, 19, 20.

During a strong collision acceleration, the electronic control system will reliably perform to increase the repulsion force generated between resonant electromagnets 1-8 and induction loops 17 mounted on the flywheel 29. The approaching flywheel 29 will repel the lightweight interior bulkhead 18, 19, 20 causing the interior bulkhead to be carried, crashing through the surrounding layer of thermal insulation. The crushing of the insulation will efficiently absorb the collision impact in an accident without destroying the flywheel 29.

As can be readily understood from the foregoing description of the invention 40, the present structure can be configured in different modes to provide the ability to perform the crash-survivability function of the invention 40.

Accordingly, modifications and variations to which the invention 40 is susceptible may be practiced without departing from the scope and intent of the appended claims.

What is claimed is:

1. A portable crash survivable stabilized kinetic energy storage machine, comprising, a freely rotating flywheel formed of composite material evacuated interior bulkhead means and an outer bulkhead means enclosing said flywheel, superconductive induction loop means attached to the inner surfaces of said flywheel and providing levitation of said flywheel, resonant superconductive electromagnet means attached to said interior bulkhead means for providing levitation flywheel, electronic means for controlling levitation of said flywheel, light weight motor-generator means composed of magnetic material means positioned along the inside radius of said flywheel, said lightweight motor-generator means being further composed of a stationary superconductive field coil means mounted within said interior bulkhead means, and means for providing a layer of crushable thermal insulation located between said interior bulkhead and said outer bulkhead means for enclosing said portable crush-survivable kinetic energy storage machine.

2. A portable crash-survivable stabilized kinetic flywheel machine as recited in claim 1, wherein said flywheel is composed mainly of high strength composite material without a high ratio of attached non-load bearing material, thereby reducing the total mass and linear collision momentum of components which are physically contained within said interior bulkhead means.

3. A portable crash-survivable stabilized kinetic flywheel machine as recited in claim 1, wherein said interior bulkhead means contains coolant flow channels surrounding the centrally located components of said electronic means and said motor-generator means.

4. A portable crash-survivable stabilized kinetic flywheel machine as recited in claim 1, and means for reducing the temperature of said flywheel by radiant transfer of heat from said flywheel to said interior bulkhead.

5. A portable crash-survivable stabilized kinetic flywheel machine as recited in claim 4, wherein said induction loop means are superconductive in order to generate minimal heat during operation, thereby limiting production of heat in said flywheel and further providing a means for aiding said reduction of temperature.

6. A portable crash-survivable stabilized kinetic flywheel machine as recited in claim 5, wherein wherein said induction loop means are levitated by repulsion from superconductive electromagnet means which are attached to said interior bulkhead means, and also wherein said induction loop means are formed of lightweight thin superconductive material in order to provide an additional means for reducing the total mass of said flywheel, thereby further reducing the total mass and linear collision momentum of components which are physically contained within said interior bulkhead means.

7. A portable crash-survivable stabilized kinetic flywheel machine as recited in claim 1, wherein wherein said superconductive electromagnet means are electrically resonant with provided parallel capacitor means forming parallel resonant circuit means.

8. A portable crash-survivable stabilized kinetic flywheel machine as recited in claim 1, wherein each said parallel resonant circuit means are provided with an electronic means for controlling magnetic field strength generated by said superconductive electromagnet means.

9. A portable crash-survivable stabilized kinetic flywheel machine as recited in claim 1, wherein wherein said layer of crushable thermal insulation material can be destroyed during a severe collision accident and afterward provide a degraded thermal insulation capability, said degraded insulation capability being adequate to allow temporarily continued functioning of said superconductive components.

10. A portable crash-survivable stabilized kinetic flywheel machine as recited in claim 6, wherein said superconductive electromagnet means provide strong levitation force, thereby crushing said layers of thermal insulation material during a collision shock.

11. A portable crash-survivable kinetic energy storage machine as recited in claim 8, wherein said electronic control means performs the function of rapidly draining kinetic energy from said rotating flywheel after said thermal insulation layer has been crushed by a collision or shock.

12. A portable crash-survivable kinetic energy storage machine as recited in claim 1, wherein said lightweight motor-generator means provides the function of accelerating or decelerating the rotation of said flywheel means while at the same time producing required minimum electrical heating within the interior bulkhead means.

13. A portable crash-survivable kinetic energy storage machine as recited in claim 12, wherein said lightweight motor-generator means, due to the simple structure of its components, also provides a means for reducing the required total mass of said components which are physically enclosed by said interior bulkhead means.

* * * * *